United States Patent [19]

Nomachi et al.

[11] Patent Number: 5,236,501

[45] Date of Patent: Aug. 17, 1993

[54] METHOD FOR PRODUCING A CEMENTITIOUS COMPOSITION IN POWDER FORM

[75] Inventors: Hiroshi Nomachi; Hiroshi Yokoyama; Shigeki Yoshida, all of Chigasaki; Yoshiro Yoshizaki, Fujisawa, all of Japan

[73] Assignee: Sandoz Ltd., Baesl, Switzerland

[21] Appl. No.: 404,234

[22] Filed: Sep. 7, 1989

[30] Foreign Application Priority Data

Sep. 9, 1988 [JP] Japan .............................. 63-224777
Feb. 28, 1989 [JP] Japan .............................. 1-48030
Jul. 11, 1989 [JP] Japan .............................. 1-177244

[51] Int. Cl.⁵ .............................................. C04B 7/02
[52] U.S. Cl. ..................................... 106/723; 106/724
[58] Field of Search ................... 106/90, 100; 264/63

[56] References Cited

U.S. PATENT DOCUMENTS 3,765,916 10/1973 Berthier ............................. 106/102
4,225,357 9/1980 Hodson ............................. 106/86
4,379,081 4/1985 Rootham et al. ................... 252/628
4,663,104 5/1987 Ito et al. ............................. 264/60

FOREIGN PATENT DOCUMENTS 0255656 5/1984 Japan .................................. 106/90

Primary Examiner—Mark L. Bell
Assistant Examiner—A. Wright
Attorney, Agent, or Firm—Robert S. Honor; Richard E. Vila; Walter F. Jewell

[57] ABSTRACT

A method for manufacturing a cementitious composition comprising a) uniformally fluidising in a container, particles of a substantially dry powdered cementitious composition by creating aerial motion of the particles by rotational motion perpendicular to the fall of the particles, b) at the same time uniformally spraying the particles with 0.1 to 10 parts by weight (per 100 parts of cementitious composition) of water, optionally containing a cement admixture, and c) mixing the particles and the water intensively by shearing forces.

14 Claims, 2 Drawing Sheets

METHOD FOR PRODUCING A CEMENTITIOUS COMPOSITION IN POWDER FORM

The invention relates to a method for manufacturing a modified cementitious composition in powder form.

According to the invention there is provided a method for manufacturing a cementitious composition comprising a) uniformally fluidising, in a container, particles of a substantially dry powdered cementitious composition by creating aerial motion of the particles by rotational motion perpendicular to the fall of the particles, b) at the same time uniformally spraying the particles with 0.1 to 10 parts by weight (per 100 parts of cementitious composition) of water, optionally containing a cement admixture, and c) mixing the particles and the water intensively by shearing forces.

Preferably, shearing forces over the surface of the composition occur by the combination of rotation and friction and lead to the formation of layers of cement hydration products on the surface of the particles. More preferably, shearing forces occur in the container by a revolving rotor carrying protruding pins.

Preferably, when the cementitious composition is used in making ready mix concrete, once a cementitious composition has been treated according to the invention, the cementitious composition is mixed substantially dry with aggregate or cement additive for at least 3 minutes prior to treating with mixing water.

Preferably, prior to the addition of water, a cement additive (hereinafter referred to as the cement additive) and/or a cement admixture (hereinafter referred to as the cement admixture) is added to the cementitious composition.

Preferably, during water addition, the water contains a cement admixture.

Preferably the amount of water sprayed onto the cementitious composition is 0.5 to 5%, more preferably 0.5 to 2%, most preferably about 1% based on the cementitious composition.

The timing of adding the cement additive or admixture is not critical to the invention. Part or all of the admixture may be added to the cementitious composition prior to the addition of water or during the water addition step. The admixture may even be blended in after the water addition step.

By the term fluidising is meant that the particles of the cement composition are dispersed in aerial motion, preferably substantially throughout the container.

Preferably the cement of the cementitious composition is selected from portland cement, high alumina cement and blended cement, for example pozzolanic cement, slag cement or other types.

More preferably the cementitious composition to be treated according to the invention is an ultra-rapid hardening cementitious composition.

Preferably the cementitious composition contains an additive selected from fly ash, ground blast furnace slag and finely divided silica powder.

Preferably the cement admixture is a superplasticiser, a plasticiser or a water reducing agent, preferably an air entraining water reducing agent or a high range water reducing agent.

Suitable cement admixtures include products based on gluconate, glucoheptonate, ligninsulphonate, dextrin, alkali carbonate, citrate, condensation products of naphthalene sulphonate or melamine sulphonate with formaldehyde, polymers based on an aromatic amino sulphonate, polystyrene sulphonate, hydroxypolyacrylate, a copolymer of an $\alpha$ or $\beta$ unsaturated dicarboxylic acid and an olefin, a copolymer of polyethylene glycol monoaryl ethers with maleic acid or a copolymer derived from monomers capable of copolymerization with such monomers; a copolymer of isobutylene-styrene with maleic acid, a copolymer of isobutylene-acrylic acid ester and maleic acid; a copolymer of isobutylene-styrene-acrylic acid ester with maleic acid; and a copolymer derived from a polyalkylene glycol monomethacrylic acid ester or polyalkylene glycol monoacrylic acid ester and acrylic acid or methacrylic acid. Other chemical admixtures may also be used such as set retarding agents, set accelerating agents, strength increasing agents, air content adjustment agents, anti-freeze agents and pigments.

Preferably the cementitious composition is treated in a continuous process according to the invention.

BRIEF DESCRIPTION OF THE DRAWINGS

Preferably uniform aerial motion is obtained by the rotation of a continuous type mixer. More preferably the aerial motion of the particles is carried out by a Spiral Pin Mixer, most preferably by that of Pacific Machinery & Engineering Co., Ltd., Model SPM-25D. The function of this mixer is explained in the following brief description with reference to FIG. 1. Dry powdered cementitious composition is introduced via inlet 1 and is passed out, after treatment, via outlet 2. Water is introduced via conduct 3 and sprayed through the narrow opening 4 on the particles. The mixture is made to rotate by the high speed revolution of rotor 5 and pushed into zone 6 where it comes into contact with the pins 7. The combination of rotation and friction at the pins causes the shearing forces at the surface of the particles.

An example of manufacture of ready mix fresh concrete by the method of this invention is shown by a flow chart (FIG. 2).

Figure 1:
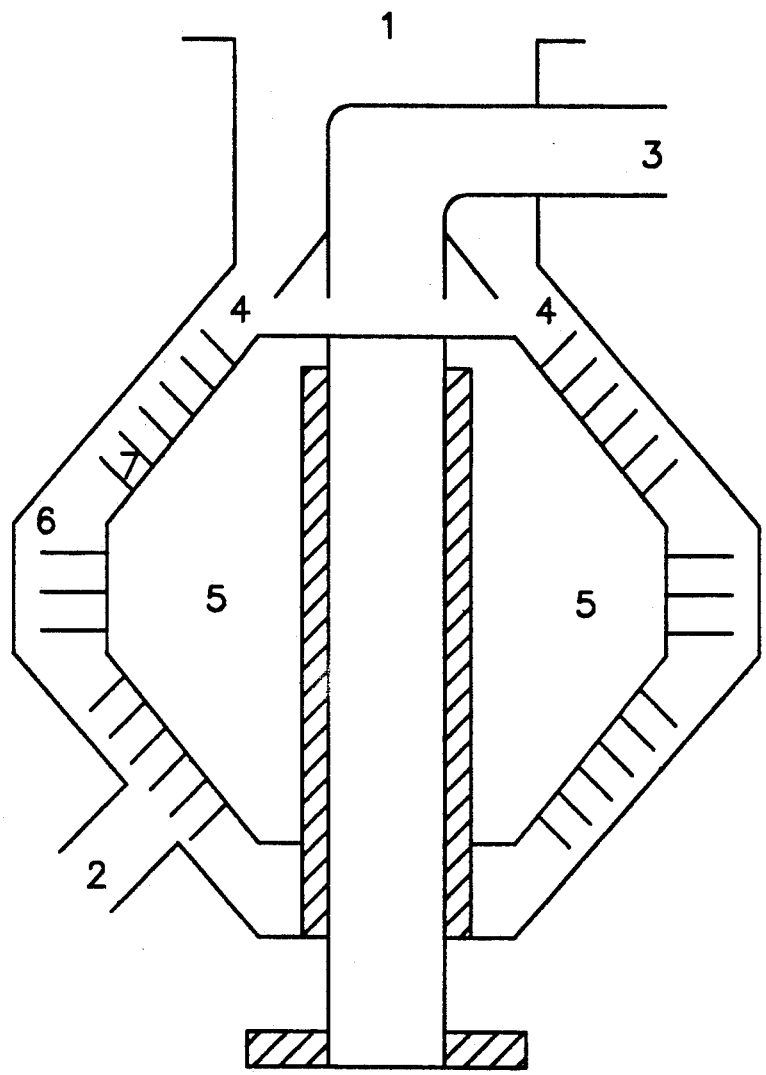
Figure 2:
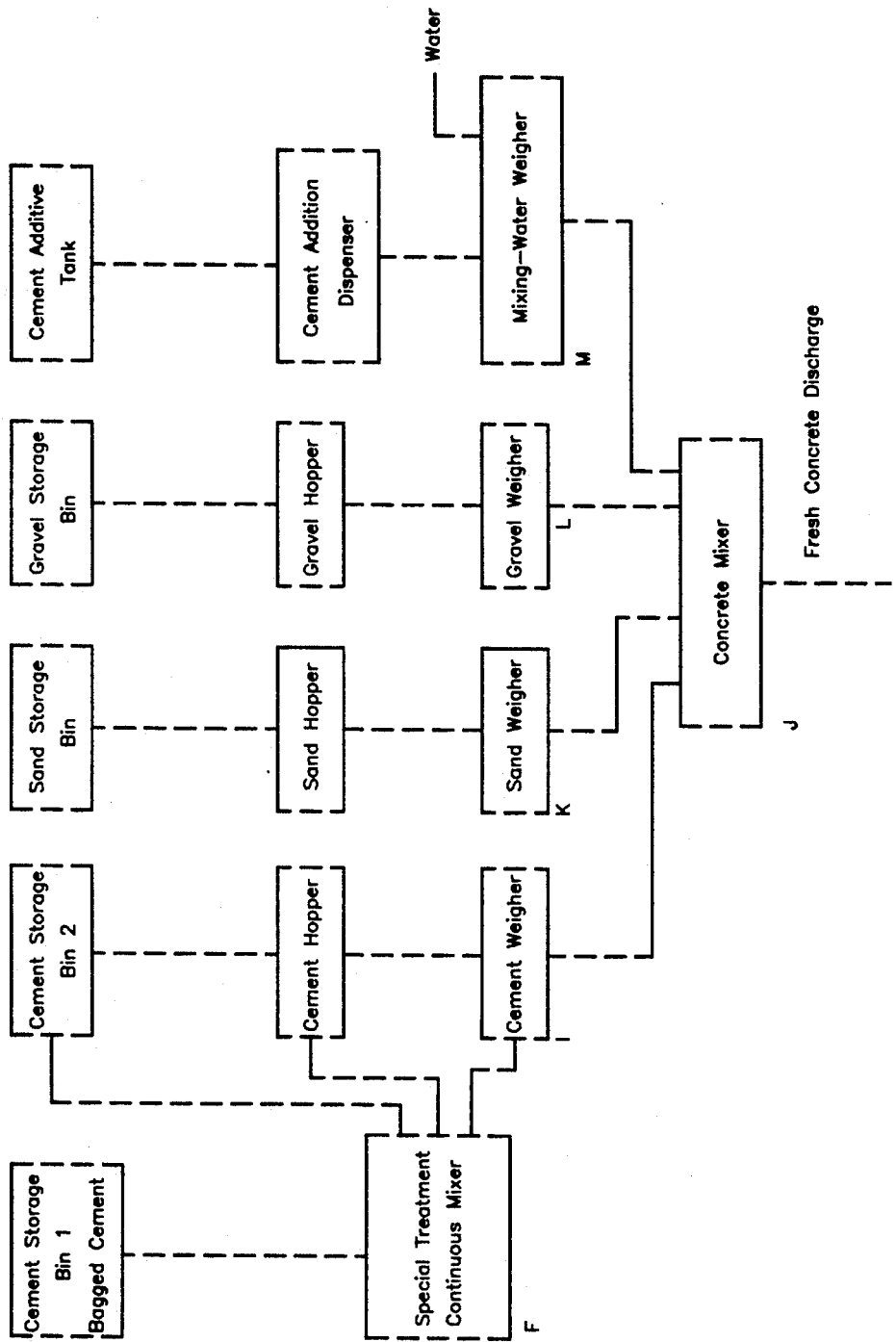
In FIG. 2, cement composition in powder form is supplied from cement storage bin 1 (E) to continuous mixer (F) for special treatment. The cement composition discharged from the abovementioned continuous mixer is supplied to a cement storage bin 2 (G), cement hopper (H) or cement weigher (I). Also, temporary storage may occur at cement hopper (H) coming from cement storage bin 2 (G). Next, the individual materials (I) are added. Next, the individual materials finished weighing in the cement weigher (I), sand weigher (K), gravel weigher (L) and mixing water weigher (M) are supplied into the concrete mixer (J). The individual materials are thoroughly mixed in mixer (J) and then discharged as fresh concrete.

Preferably application of the water to the cementitious composition is by spraying so as to give a uniform distribution of moisture.

Some of the advantages of cementitious compositions treated by a method according to the invention over untreated composition are:

1. Small amounts of water are required to achieve the same consistency with cementitious composition produced by known methods. Consequently, the compressive strength and durability increase and drying shrinkage decreases.

Where the cementitious composition in powder form is treated according to the invention, if the consistency of cement mortar or concrete is made the same as for an untreated cementitious composition, the quantity of water required for mixing is extremely small (compared with that required for the untreated composition). Consequently, workability and fillability of concrete are improved and further, concrete made with cementitious compositions treated according to the invention is of excellent quality.

2. Fluidity is improved and a good initial strength gain is obtained.

Where the cementitious composition in powder form is treated according to the method of this invention, if the same amount of water used to mix cement mortar or concrete is used as for an untreated cementitious composition, the fluidity is extremely high (compared with the untreated composition).

3. The amount of 'bleeding' water is reduced and the volume change after application of the concrete is reduced.

4. The amount of cement required to produce the same strength is reduced.

5. The reduction in fluidity that occurs over time is reduced thereby allowing transportation over a long period of time to become feasible.

6. Where a part of the cement composition is replaced with a mineral additive (fly ash or ground blast-furnace slag), not only is the amount of heat required to cause hydration reduced, but also the problematic reduction in initial strength is reduced.

7. Further, as reduction in initial strength is small when a part of the cement composition replaced by the abovementioned mineral additives it is possible for the same kind of use to be made with such cementitious compositions as with those having no such replacement. There is also no setting delay in placement work using cementitious compositions treated according to the invention.

8. With such advantages, it is possible to use cementitious compositions containing mineral additives that are less expensive than cement with good economic savings as well as providing effective utilization of the industrial by-products, for example fly ash and blast-furnace slag.

9. In case of ultra-rapid-hardening cementitious compositions treated according to the invention, set retardation properties are improved.

The excellent characteristics cited above are demonstrated in all concretes used in the fields of civil engineering and architecture, and these characteristics are extremely useful in concretes subjected to meteorological and environmental effects, for example, hot-weather concrete, cold-weather concrete, underwater concrete, offshore concrete, prestressed concrete and precast concrete (requiring high strengths at early age), mass concrete, dam concrete, high-strength concrete (in which cracking due to thermal stress is a significant problem) and concretes having high fluidity, fibre reinforced concrete and foamed concrete.

According to a method according to the invention, it is possible to manufacture a cementitious composition in powder form having the following improvements in characteristics over the untreated composition:

1. Strength gain is increased. Especially, initial strength gain is large.

2. Drying shrinkage is reduced. As a result, the amount of shrinkage cracks is reduced.

3. Bleeding is reduced. As a result, settling of concrete after placement is reduced.

4. Density of concrete is increased.

5. The actual amount of cement needed can be reduced. As a result, the amount of cracking due to thermal stresses can be reduced. Further the initial heat of hydration can be reduced.

The invention will now be illustrated by the following examples.

EXAMPLE 1

A continuous-type mixer is used and an aqueous solution containing water and a high-range water-reducing agent (a condensate of $\beta$-naphthalene sulfonate and formaldehyde, a product commercially available) is sprayed onto ordinary portland cement.

A Spiral Pin Mixer Improved Model SPM-25D (mfd. by Pacific Machinery & Engineering, Co., Ltd.) is used in this example.

The portland cement is introduced into this continuous-type mixer at a rate of 18.75 kg/min and the aqueous solution of high-range water-reducing agent (32.43% concentration) is continuously supplied and sprayed at feeding rate of 277.5 g/min.

The appearance of the cement composition in powder form obtained upon this spraying treatment is no different from that of an untreated portland cement. The results of tests on this modified cement composition in powder form are given in Table 1.

The cement composition obtained by such treatment is sampled every 5 minutes after start of treatment and the quantity of water and water-reducing agent sprayed on are measured. The method of measurement is the loss on ignition test according to JIS R 5202 (Method for Chemical Analysis of Portland Cement) collecting samples every 5 minutes (starting at 5 minutes and going on until 160 minutes elapse). Loss on ignition is the weight loss of a substance subjected to repetitions of ignition in air for 15 minutes at 950° C., indicating the amount of reduction in moisture, organics, and $CO_2$ through volatilization. The results are given in Table 2 below.

TABLE 1

| Type of cement | Dosage of HRWR agent (*1) | Amount (kg/m3) Cement | Amount (kg/m3) Water | Water reduction (%) | Slump (cm) | Air content (%) | Compressive strength (kgf/cm2) 3 day | Compressive strength (kgf/cm2) 7 day | Compressive strength (kgf/cm2) 28 day |
|---|---|---|---|---|---|---|---|---|---|
| Untreated high-early strength portland cement | — | 320 | 195 | — | 18.0 | 1.8 | 210 (100) | 302 (100) | 416 (100) |
|  | 0.48% (dry weight) | 320 | 165 | 15.4 | 18.5 | 4.3 | 298 (142) | 396 (131) | 494 (119) |
| Cement composition obtained in Example 1 | — | 320 | 138 | 29.2 | 18.5 | 4.9 | 400 (190) | 518 (172) | 657 (158) |

Note
1) The dosage of high-range water-reducing agent applied is the same as that used in example 1, with addition made to untreated high early strength portland cement when mixing concrete.

TABLE 1-continued

2) In Example 1, moisture of 1.0% and high-range water-reducing agent of 0.48% (solids) are added at percentages of cement composition.
3) Figures in ( ) on compressive strengths are ratios of cases of untreated portland cement not using high-range water-reducing agent as 100.
4) Materials used in the concrete:

| | |
|---|---|
| Cement | High early strength portland cement of Nihon Cement Co. |
| Fine aggregate | Shizuoka Prefecture Oi River System pit sand, with FM of 2.71 and specific gravity of 2.63 |
| Coarse aggregate | Tokyo Ohme greywacke crused stone, with FM of 6.78 and specific gravity of 2.65 |

TABLE 2

| Sample No. | Time sampled | Ignition loss (%) |
|---|---|---|
| 1 | 5 min. after | 2.2 |
| 2 | 10 min. | 2.3 |
| 3 | 15 min. | 2.4 |
| 4 | 20 min. | 2.2 |
| 5 | 25 min. | 2.3 |
| 6 | 30 min. | 2.3 |
| 7 | 35 min. | 2.1 |
| 8 | 40 min. | 2.1 |
| 9 | 45 min. | 2.0 |
| 10 | 50 min. | 2.4 |
| 11 | 55 min. | 2.0 |
| 12 | 60 min. | 2.0 |
| 13 | 65 min. | 2.1 |
| 14 | 70 min. | 2.1 |
| 15 | 75 min. | 2.0 |
| 16 | 80 min. | 2.2 |
| 17 | 85 min. | 2.2 |
| 18 | 90 min. | 2.0 |
| 19 | 95 min. | 2.0 |
| 20 | 100 min. | 2.0 |
| 21 | 105 min. | 2.1 |
| 22 | 110 min. | 2.2 |
| 23 | 115 min. | 2.0 |
| 24 | 120 min. | 2.2 |
| 25 | 125 min. | 2.2 |
| 26 | 130 min. | 2.2 |
| 27 | 135 min. | 2.3 |
| 28 | 140 min. | 2.4 |
| 29 | 145 min. | 2.4 |
| 30 | 150 min. | 2.2 |
| 31 | 155 min. | 2.4 |
| 32 | 160 min. | 2.4 |

Average 2.18
Standard deviation 0.142

CONCLUSIONS

As seen in Table 1, the modified cement composition in powder form obtained, when compared with untreated portland cement, requires an extremely small amount of water to provide the same consistency, and the water-reduction rate is approximately double. Consequently, compressive strength is spectacularly high.

As can be seen from the test results given in Table 2 the losses on ignition of the composition at the various sampling times are stable. The modified cement composition in powder form obtained contain 1.0 percent of moisture and 0.48 percent of high-range water-reducing agent (solids).

EXAMPLE 2

(1) Manufacture of Ultra-rapid-hardening Cement Composition in Powder Form

An ultra-rapid-hardening cement composition in powder form is manufactured using a continuous mixer, the Spiral Pin Mixer Improved Model SPM-25D (mfd. by Pacific Machinery & Engineering Co., Ltd.), supplying Jet Cement (Type A, mfd. by Sumitomo Cement Co., Ltd.) at a rate of 14.17 kg/min and continuously spraying with water at a rate of 141.7 g/min. This results in 1% (based on the cement) of water being added to the cement composition in powder form.

(2) Mortar Tests of Ultra-rapid-hardening Cement Composition

Using the ultra-rapid-hardening cement composition in powder form (B1) obtained according to (1) above, cement mortars are made following the mix proportions given in Table 3, and the physical properties are tested.

Flow values are measured in accordance with JIS R 5201 in a constant-temperature 20°±3° C. and humidity not less than 80 percent. For compressive strength tests, specimens of 5×5×5 cm are moulded according to ASTM C 109 and cured for up to 24 hours in a constant-temperature room of temperature 20°±3° C. and humidity not less than 80 percent, after which curing is done in water of temperature 20°±3° C. for the required time. The results of the mortar tests with this cement composition are given in Table 3.

The materials of the cement mortars in this example are as follows:

Untreated cement (J1):
Jet Cement (Type A, mfd, by Sumitomo Cement Co., Ltd.).

Cement composition (B1):
Modified ultra-rapid-hardening cement composition in powder form made by adding 1 percent water to untreated cement (J1) by the method of this invention.

Fine aggregate:

| Oi River System pit sand | |
|---|---|
| Specific gravity | 2.65 |
| Absorption | 1.57% |
| Fineness modulus | 2.57% |

TABLE 3

| Experiment No. | Type of cement | Water-cement ratio (%) | Sand-cement ratio | Flow | Setting time (min:sec) | | Compressive strength (kgf/cm2) | | | |
|---|---|---|---|---|---|---|---|---|---|---|
| | | | | | Initial | Final | 1 hr. | 3 hr. | 1 day | 28 day |
| 1 | J1 | 58.0 | 2.75 | 177 | 7:50 | 10:20 | 85.5 (100) | 166 (100) | 201 (100) | 429 (100) |
| 2 | B1 | 52.0 | 2.75 | 178 | 12:50 (+5:00) | 16:00 (+5:40) | 147 (172) | 232 (140) | 327 (163) | 518 (121) |

CONCLUSIONS

As indicated in Table 3, the water-cement ratio of mortar in case of using the modified ultra-rapid-hardening cement in powder form obtained by the method of this invention are 6% lower for identical flow compared with untreated cement (J1). With regard to setting, there is a retarding effect of about 5 minutes for both initial set and final set, while compressive strengths after 1 hour, 3 hours, 1 day and 28 days are high compared with untreated cement (J1).

EXAMPLE 3

(1) Manufacturing of Ultra-rapid-hardening Cement Composition in Powder form

An ultra-rapid-hardening cement composition in powder form (B2) is manufactured by supplying at a rate of 14.7 kg/min using a continuous-type mixer, Spiral Pin Mixer Improved Model SPM-25D (mfd. by Pacific Machinery & Engineering Co., Ltd.), a uniformly blended cement composition of cement 0.5% (by weight of cement) admixture (dry powder of a condensate of β-naphthalene sulfonate and formaldehyde) and Jet Cement (type A, mfd. by Sumitomo Cement Co., Ltd.) and spraying water continuously at a rate of 141.0 g/min. Using the same continuous mixer, Jet Cement (Type A, mfd, by Sumitomo Cement Co., Ltd.) is supplied at a rate of 14.17 kg/min, and an aqueous solution of a condensate of β-naphthalene sulfonate and formaldehyde (33.3% concentration) is continuously sprayed on at a rate of 212.8 g/min to provide an ultra-rapid-hardening cement composition in powder form (B3). The ultra-rapid-hardening cement compositions in powder form (B2) and (B3) have 1% water and 0.5% (of dry powder) of the condensate of β-naphthalene sulfonate and formaldehyde added.

(2) Mortar Test of Ultra-rapid-hardening Cement

Cement mortars are manufactured according to the mix proportions given in Table 4 using the ultra-rapid-hardening cement composition (B1) manufactured in Example 2 and the compositions (B2) and (B3) manufactured according to (1) above, and the physical properties are tested.

Flow values are measured according to JIS R 5201 in a constant-temperature room of temperature 20°±3° C. and humidity not less than 80%. The time of setting is measured according to Appendix 1 of JIS A 6204. For compressive strength tests specimens of 5×5×5 cm are moulded according to ASTM C 109 and cured for up to 24 hours in a constant-temperature room of temperature 20°±3° C. and humidity not less than 80%, after which curing is done in water of temperature 20°±2° C. for the prescribed time. The results of the mortar tests with this cement composition are given in Table 4.

The materials of the cement mortars in this example were as follows:

Untreated cement (J1):
Jet Cement (Type A, mfd, by Sumitomo Cement Co., Ltd.)

Cement composition (B1):
Modified ultra-rapid-hardening cement composition in powder form made by adding 1% water to untreated cement (J1) by the method of this invention.

Cement composition (B2):
Modified ultra-rapid-hardening cement composition in powder form made by adding 1% water to a uniform mixture of untreated cement (J1) and dry powder of a condensate of β-naphthalene sulfonate and formaldehyde in an amount of 0.5% by weight of the cement.

Cement composition (B3):
A modified ultra-rapid-hardening cement composition with 1% water and 0.5% of dry powder of a condensate of β-naphthalene sulfonate and formaldehyde prepared by spraying an aqueous solution of a condensate of β-naphthalene sulfonate and formaldehyde (33.3% concentration) onto untreated cement (J1) by the method of this invention.

Fine aggregate:

| Oi River System pit sand | |
| --- | --- |
| Specific gravity | 2.65 |
| Absorption | 1.57% |
| Fineness modulus | 2.57% |

Cement admixture:
A condensate of β-naphthalene sulfonate and formaldehyde (commercially available).

TABLE 4

| Experiment No. | Type of cement | Admixture dosage | Water-cement ratio (%) | Sand-cement ratio | Flow | Setting time (min:sec) Initial | Final | Compressive strength (kgf/cm2) 1 hr. | 3 hr. | 1 day | 28 day |
| --- | --- | --- | --- | --- | --- | --- | --- | --- | --- | --- | --- |
| 1 | J1 | 0.5 | 57 | 2.75 | 196 | 8:00 | 10:00 | 80.8 | 145 | 237 | 360 |
| 2 | B1 | 0.5 | 41 | 2.75 | 195 | 9:20 | 12:10 | 132 | 328 | 512 | 530 |
| 3 | B2 | — | 41 | 2.75 | 192 | 9:00 | 12:30 | 130 | 336 | 508 | 525 |
| 4 | B3 | — | 41 | 2.75 | 194 | 9:30 | 12:10 | 138 | 331 | 518 | 528 |

Note
1) The Dosage of the admixture is shown in dry weight percent to the cement content.
2) The admixture was added to the mixing water in experiments 1 and 2.

CONCLUSIONS

As indicated in Table 4, the water-cement ratios of mortars in the cases of using the modified ultra-rapid-hardening cements in powder form, (B1), (B2) and (B3) made by the method of this invention are 16% lower for identical flow compared with untreated cement (J1). With regard to time of setting, there is a retarding effect of about 1 minute for initial set and 2 minutes for final set, while compressive strengths at 1 hour, 3 hours, 1 day and 28 days are extremely high compared with untreated cement (J1).

EXAMPLE 4

Using the modified ultra-rapid-hardening cement composition (B1) obtained using Jet Cement (Type A, mfd. by Sumitomo Cement Co., Ltd.) and providing the same treatment as in Example 2, cement mortar tests are performed adding cement admixtures as indicated in Tables 5 to 9. As commercial cement admixtures, sodium gluconate, calcium lignosulfonate, dextrin, a condensate of β-naphthalene sulfonate and formaldehyde, a condensate of melamine sulfonate and formaldehyde are used, in the amounts indicated in Table 5 to 9. Mortars are manufactured in a constant-temperature room of temperature 20°±3° C. and humidity not less than 80% with target flow value of 195±5 mm and sand-cement ratio of 2.75. Flow values are measured in accordance with JIS R 5201. Time of setting is measured in accordance with Appendix 1 of JIS A 6204. For compressive strength, tests specimens of 5×5×5 cm are moulded according to ASTM C 109 and cured for up to 24 hours in a room of constant temperature 20°±3° C. and constant humidity not less than 80% after which curing is done in water of temperature 20°±2° C. for the required time. The results of these tests are given in Table 5 to 9.

The materials of the cement mortars in this example are as follows:

Untreated cement (J1):

Jet Cement (Type A, mfd, by Sumitomo Cement Co., Ltd.).

Cement composition (B1):

Modified ultra-rapid-hardening cement composition in powder form made by adding 1 percent water to untreated cement (J1) by the method of this invention.

Fine aggregate:

| Oi River System pit sand | |
| --- | --- |
| Specific gravity | 2.65 |
| Absorption | 1.57% |
| Fineness modulus | 2.57% |

TABLE 5

| Type of cement | Admixture Type | dosage* | Water-cement ratio (%) | Sand-cement ratio | Flow | Setting time (min:sec) Initial | Final | Compressive strength (kgf/cm2) 1 hr. | 3 hr. | 1 day | 28 day |
| --- | --- | --- | --- | --- | --- | --- | --- | --- | --- | --- | --- |
| J1 | Sodium | 0.1 | 59 | 2.75 | 196 | 10:50 | 14:40 | 53.5 | 117 | 226 | 316 |
| J1 | gluco- | 0.15 | 58 | 2.75 | 196 | 10:50 | 16:00 | 39.9 | 121 | 273 | 343 |
| B1 | nate | 0.1 | 47 | 2.75 | 196 | 12:50 | 18:00 | 102 | 225 | 465 | 525 |
| B1 | | 0.15 | 46 | 2.75 | 198 | 13:10 | 18:50 | 73.3 | 280 | 494 | 548 |

*The dosage of the admixture is shown in dry weight percent based on the cement content.

TABLE 6

| Type of cement | Admixture Type | dosage* | Water-cement ratio (%) | Sand-cement ratio | Flow | Setting time (min:sec) Initial | Final | Compressive strength (kgf/cm2) 1 hr. | 3 hr. | 1 day | 28 day |
| --- | --- | --- | --- | --- | --- | --- | --- | --- | --- | --- | --- |
| J1 | Calcium | 0.25 | 62 | 2.75 | 193 | 8:20 | 12:00 | 58.2 | 107 | 181 | 294 |
| J1 | ligno- | 0.5 | 58 | 2.75 | 198 | 9:30 | 13:10 | 49.4 | 115 | 205 | 300 |
| B1 | sulfo- | 0.25 | 48 | 2.75 | 192 | 10:40 | 16:00 | 73.4 | 189 | 335 | 423 |
| B1 | nate | 0.5 | 42 | 2.75 | 191 | 12:10 | 18:00 | 64.2 | 238 | 370 | 434 |

*The dosage of the admixture is shown in dry weight percent based on the cement.

TABLE 7

| Type of cement | Admixture Type | dosage* | Water-cement ratio (%) | Sand-cement ratio | Flow | Setting time (min:sec) Initial | Final | Compressive strength (kgf/cm2) 1 hr. | 3 hr. | 1 day | 28 day |
| --- | --- | --- | --- | --- | --- | --- | --- | --- | --- | --- | --- |
| J1 | Dextrin | 0.3 | 57 | 2.75 | 193 | 12:40 | 16:50 | 33.4 | 90.5 | 233 | 304 |
| J1 | | 0.6 | 51 | 2.75 | 194 | 20:20 | 30:00 | 23.7 | 99.0 | 364 | 388 |
| B1 | | 0.3 | 45 | 2.75 | 199 | 14:00 | 19:00 | 55.1 | 179 | 492 | 553 |
| B1 | | 0.6 | 40 | 2.75 | 197 | 21:00 | 31:20 | 33.6 | 171 | 572 | 640 |

*The dosage of the admixture is shown in dry weight percent based on the cement.

TABLE 8

| Type of cement | Admixture Type | dosage* | Water-cement ratio (%) | Sand-cement ratio | Flow | Setting time (min:sec) Initial | Final | Compressive strength (kgf/cm2) 1 hr. | 3 hr. | 1 day | 28 day |
| --- | --- | --- | --- | --- | --- | --- | --- | --- | --- | --- | --- |
| J1 | Condensate | 0.5 | 57 | 2.75 | 198 | 8:20 | 10:30 | 82.4 | 148 | 234 | 366 |
| J1 | of β-naph- | 1.5 | 55 | 2.75 | 194 | 8:30 | 11:00 | 92.5 | 174 | 275 | 419 |
| B1 | thalene sulfo- | 0.5 | 41 | 2.75 | 194 | 9:30 | 12:30 | 135 | 330 | 508 | 526 |
| B1 | nate and formaldehyde | 1.5 | 39 | 2.75 | 190 | 10:20 | 15:10 | 150 | 366 | 563 | 581 |

*The dosage of the admixture is shown in dry weight percent based on the cement.

TABLE 9

| Type of cement | Admixture Type | dosage* | Water-cement ratio (%) | Sand-cement ratio | Flow | Setting time (min:sec) Initial | Final | Compressive strength (kgf/cm2) 1 hr. | 3 hr. | 1 day | 28 day |
| --- | --- | --- | --- | --- | --- | --- | --- | --- | --- | --- | --- |
| J1 | Condensate | 0.4 | 61 | 2.75 | 195 | 7:50 | 11:00 | 56.5 | 108 | 210 | 307 |
| J1 | of Melamine | 0.8 | 60 | 2.75 | 192 | 8:00 | 11:20 | 60.3 | 131 | 218 | 325 |
| B1 | sulfonate and | 0.4 | 44 | 2.75 | 199 | 8:20 | 11:30 | 117 | 271 | 458 | 504 |
| B1 | formaldehyde | 0.8 | 42 | 2.75 | 194 | 9:00 | 12:20 | 137 | 339 | 496 | 542 |

*The dosage of the admixture is shown in dry weight percent to the cement.

CONCLUSIONS

In Example 4, as indicated in Tables 5 to 9, when one compares the cementitious compositions with the individual cement admixtures having the same flow values, the cement composition (B1) treated with 1% water not only imparts an increase in the setting time, but also can greatly reduce amount of cement needed and increase compressive strength compared with untreated cement (J1).

EXAMPLE 5

(1) Manufacture of Cement Composition

A cement composition is manufactured using the continuous-type mixer, Spiral Pin Mixer Improved Model SPM-25D (mfd. by Pacific Machinery & Engineering Co., Ltd.), and following the mix proportions for the test numbers given in Table 10. High-early-strength portland cement (M1) (mfd. by Mitsubishi Mining & Cement Co., Ltd.) is supplied to the mixer at a rate of 18.75 kg/min. An aqueous solution prepared of a high-range water-reducing agent, (a condensate of β-naphthalene sulfonate and formaldehyde—32.43% concentration— a commercially available product), is continuously sprayed on at a rate of 277.5 g/min. The cement composition (C1) obtained contains 1% moisture, and 0.48% of the high-range water-reducing agent based on dry weight used.

The above method is repeated using a cement composition (D1) with 1% water added and continuously spraying the water onto high-early-strength portland cement (mfd. by Mitsubishi Mining & Cement Co., Ltd.) using the continuous mixer.

(2) Concrete Tests

Tests No. 6 to No. 8, Table 10, show results using cement composition (D1) prepared by the above-mentioned method and replacing with 20 to 40% fly ash. Concretes are prepared according to the mix proportions under the various test numbers in Table 10 and cylindrical concrete specimens 10 cm in diameter and 20 cm in height are made and compressive strength tests performed. However, the dosage of high-range water-reducing agent is 0.48% by dry weight of the total amount of cement composition and fly ash, and the addition is made at the time of mixing. The same could be said of the amount of water which is indicated by the weight in relation to the total amount.

TABLE 10

| Experiment No. | Proportions | | | | | | Test results | | | | | | |
|---|---|---|---|---|---|---|---|---|---|---|---|---|---|
| | Cement or cement Composition | | Qty. of mineral additive | HRWR agent | Water Content | Water-binder ratio | Sand-coarse agg. ratio | Slump | Air Content | Water reduction | Compressive strength (kgf/cm2) | | | |
| | Type | Qty (kg/m3) | (fly ash) (kg/m3) | (%) | (kg/m3) | (%) | (%) | (cm) | (%) | (%) | 1 day | 2 day | 3 day | 28 day |
| 1 | M1 | 450 | 0 | 0.48 | 170 | 37.8 | 42 | 17.5 | 1.6 | 0 | 291 | 513 | 642 | 774 |
| 2 | C1 | 450 | 0 | 0 | 133 | 29.6 | 42 | 18.0 | 1.1 | 21.8 | 470 | 726 | 830 | 957 |
| 3 | M1 | 360 | 90 | 0.48 | 160 | 35.6 | 42 | 19.0 | 2.1 | 5.9 | 227 | 429 | 539 | 661 |
| 4 | M1 | 315 | 135 | 0.48 | 155 | 34.4 | 42 | 19.0 | 2.0 | 8.8 | 189 | 393 | 489 | 603 |
| 5 | M1 | 270 | 180 | 0.48 | 151 | 33.6 | 42 | 19.0 | 2.0 | 11.2 | 161 | 337 | 421 | 542 |
| 6 | D1 | 360 | 90 | 0.48 | 129 | 28.7 | 42 | 19.0 | 1.3 | 24.1 | 370 | 633 | 741 | 891 |
| 7 | D1 | 315 | 135 | 0.48 | 126 | 28.0 | 42 | 19.0 | 1.5 | 25.9 | 301 | 567 | 682 | 870 |
| 8 | D1 | 270 | 180 | 0.48 | 124 | 27.6 | 42 | 17.5 | 1.6 | 27.1 | 241 | 494 | 607 | 772 |

Note
1) Cement (M1) used is high early strength portland cement manufactured by Mitsubishi Mining and Cement Co., Ltd.
2) Cement composition (C1) is a modified cement composition obtained by treating the cement (M1) with a 32.43% aqueous solution of high-range water-reducing agent defined in 7) below.
3) Cement composition (D1) is a cement composition obtained by treating cement (M1) with 1% water.
4) Fly ash used is that manufactured by EPDC Fly Ash Co., Ltd., with specific gravity of 2.19 and fineness of 2880 cm$^2$/g.
5) Fine aggregate used is Oi River System pit sand, with specific gravity of 2.63 and fineness modulus of 2.71.
6) Coarse aggregate used is Ohme greywacke crushed stone, with specific gravity of 2.64 and maximum diameter of 20 mm.
7) High-range water-reducing agent is a condensate of sodium β-naphthalene sulfonate and formaldehyde (commercially available).

TABLE 11

| Experiment No. | Proportions | | | | | | Test results | | | | | | |
|---|---|---|---|---|---|---|---|---|---|---|---|---|---|
| | Cement or cement Composition | | Qty. of mineral additive | HRWR agent | Water Content | Water-binder ratio | Sand-coarse agg. ratio | Slump | Air Content | Water reduction | Compressive strength (kgf/cm2) | | | |
| | Type | Qty (kg/m3) | (fly ash) (kg/m3) | (%) | (kg/m3) | (%) | (%) | (cm) | (%) | (%) | 1 day | 2 day | 3 day | 28 day |
| 9 | M1 | 320 | 0 | 0.48 | 152 | 47.5 | 45 | 18.5 | 4.4 | 0 | 166 | 312 | 440 | 519 |
| 10 | M1 | 224 | 96 | 0.48 | 144 | 45.0 | 45 | 18.0 | 4.3 | 5.3 | 115 | 253 | 365 | 457 |
| 11 | E1 | 320 | 0 | 0 | 115 | 35.9 | 45 | 17.5 | 4.2 | 24.3 | 171 | 322 | 429 | 533 |
| 12 | E2 | 320 | 0 | 0 | 113 | 35.3 | 45 | 17.5 | 4.2 | 25.7 | 140 | 277 | 383 | 483 |

Note
1) Cement (M1) used is a high early strength portland cement manufactured by Mitsubishi Mining and Cement Co., Ltd.
2) Cement composition (E1) is a modified cement composition obtained by blending thoroughly 100 parts by weight of cement (M1) with 42.9 parts by weight of fly ash beforehand, and then treating the mixture with a 32.43% aqueous solution of high-range water-reducing agent.
3) Cement composition (E2) is a modified cement composition obtained by blending thoroughly 100 parts by weight of cement (M1) with 66.7 parts by weight of fly ash beforehand, and then treating the mixture with a 32.43% aqueous solution of high-range water-reducing agent.
4) Fly ash used is manufactured by EPDC Fly Ash Co., Ltd., with specific gravity of 2.19 and fineness of 2880 cm$^2$/g.
5) Fine aggregate is Oi River System pit sand, with specific gravity of 2.63 and fineness modulus of 2.71.
6) Coarse aggregate is Ohme greywacke crushed stone, with specific gravity of 2.64 and maximum diameter of 20 mm.
7) High-range water-reducing agent is a condensate of sodium β-naphthalene sulfonate and formaldehyde (commercially available).

CONCLUSIONS

From the figures for Tests No. 9 and No. 10 in Table 11, the amount of high-range water-reducing agent used is 0.48% by dry weight of the cement in the batch or the total quantity of cement composition and fly ash, and this is added at the time of mixing. It is the same regarding the water content and was indicated in terms of weight to total quantity.

As can be seen in the test results given in Table 11, concretes in case of the modified cement compositions (E1) and (E2) obtained by the method of this invention had extremely marked reduced water content compared to the untreated concrete and compressive strengths that are significantly increased compared with untreated concrete as well as in case of the cement composition in which of a part of untreated cement (M1) is replaced by fly ash.

It can be seen that the compressive strength of cement composition (E1) is approximately as good as concrete made using untreated cement (M1) with no addition of fly ash.

EXAMPLE 7

Concretes are manufactured using the cement composition (C1) prepared as in Example 5 having the same cement content. The test results for these concretes are given under Tests No. 14 to No. 17 in Table 12. The test results for concrete in case of mix proportions adding 30 percent fly ash to the cement composition (C1) are given for Test No. 15. Tests No. 16 and No. 17 show the test results for concrete in cases of the mix proportions of 3 to 5 percent finely divided silica powder further added to the mix proportions of Test No. 15. In these tests, the other concrete materials are the same as in Example 5.

CONCLUSIONS

As can be seen from the test results given in Table 12, the amount of water in the concrete of Experiment (Test) No. 15 (using the modified cement composition (C1) made by the method of this invention and fly ash), shows a trend for reduction comparable with concrete using untreated cement not containing fly ash. However, the amount of water needed in the concrete in case of further adding finely divided silica powder to the mix proportions for Test No. 15 can be seen to increase with increase in the amount of addition.

The compressive strength of concrete in case of using the cement composition (C1) is approximately the same after 1 day regardless of addition of mineral admixture, but after 28 days, the compressive strengths of concrete containing 5% finely divided silica powder is extremely increased.

EXAMPLE 8

Concretes are produced using the cement composition (D1) prepared in Example 5, and replacing 30 to 70% of the composition by two varieties of ground blast-furnace slag of differing particle size. The test results for the concretes are given in Experiment (Test) No. 23 to No. 26 in Table 13. Maintaining the other concrete components the same as in Example 5, a variety of concretes are manufactured having the mix proportions given in Table 13, and compressive strength tests are performed making cylindrical concrete specimens of diameter 10 cm by height 20 cm. The amount of

TABLE 12

| Experiment No. | Cement or cement Composition Type | Qty (kg/m3) | Quantity of mineral additive (kg/m3) Fly Ash | Silica fine powder | HRWR agent (%) | Water Content (kg/m3) | Water-binder ratio (%) | Sand-coarse agg ratio (%) | Slump (cm) | Air Content (%) | Compressive strength (kgf/cm2) 1 day | 3 day | 7 day | 28 day |
|---|---|---|---|---|---|---|---|---|---|---|---|---|---|---|
| 13 | M1 | 400 | 0 | 0 | 0.48 | 167 | 41.8 | 43 | 17.5 | 1.6 | 258 | 470 | 591 | 717 |
| 14 | C1 | 400 | 0 | 0 | 0 | 135 | 33.8 | 43 | 18.0 | 1.8 | 378 | 578 | 682 | 787 |
| 15 | C1 | 400 | 120 | 0 | 0 | 132 | 25.4 | 40 | 18.5 | 1.7 | 387 | 611 | 721 | 892 |
| 16 | C1 | 400 | 120 | 12 | 0 | 135 | 25.4 | 40 | 17.5 | 1.8 | 400 | 586 | 774 | 899 |
| 17 | C1 | 400 | 120 | 20 | 0 | 137 | 25.4 | 40 | 18.5 | 1.6 | 373 | 735 | 803 | 996 |

Note
1) Cement (M1) used is a highly early strength portland cement manufactured by Mitsubishi Mining and Cement Co., Ltd.
2) Cement composition (C1) is a modified cement composition obtained by treating the cement (M1) with a 32.43% aqueous solution of high-range water-reducing agent.
3) Cement composition (D1) is a cement composition obtained by treating the cement (M1) with 1% water.
4) Fly ash is manufactured by EPDC Fly Ash Co., Ltd., with specific gravity of 2.19 and fineness of 2880 cm$^2$/g.
5) Fine aggregate is Oi River System pit sand, with specific gravity of 2.63 and fineness modulus of 2.71.
6) Coarse aggregate is Ohme greywacke crushed stone, with specific gravity of 2.64 and maximum diameter of 20 mm.
7) High-range water-reducing agent is a commercial by available condensate of sodium $\beta$-naphthalene sulfonate and formaldehyde high-range water-reducing agent that is added to total quantity of cement composition and fly ash is 0.48% (by dry weight to cement per batch). This, together with the water is added at the time of mixing.

TABLE 13

| Experiment No. | Cement or cement Composition Type | Qty (kg/m3) | Blast furnace slag powder Fineness (cm2/g) | Content (kg/m3) | HRWR agent (%) | Water Content (kg/m3) | Water-binder ratio (%) | Sand-coarse agg. ratio (%) | Slump (cm) | Air Content (%) | Water Reduction (%) | Compressive strength (kgf/cm2) 1 day | 3 day | 7 day | 28 day |
|---|---|---|---|---|---|---|---|---|---|---|---|---|---|---|---|
| 18 | M1 | 450 | — | 0 | 0.48 | 170 | 37.8 | 42 | 17.5 | 1.6 | 0 | 291 | 513 | 642 | 774 |
| 19 | M1 | 315 | 3700 | 135 | 0.48 | 165 | 36.7 | 42 | 19.0 | 2.1 | 2.9 | 172 | 345 | 470 | 656 |
| 20 | M1 | 135 | 3700 | 315 | 0.48 | 149 | 33.1 | 42 | 18.0 | 1.8 | 12.4 | 72.8 | 208 | 341 | 617 |
| 21 | M1 | 315 | 9700 | 135 | 0.48 | 166 | 36.9 | 42 | 19.0 | 2.4 | 2.4 | 184 | 389 | 524 | 678 |
| 22 | M1 | 135 | 9700 | 315 | 0.48 | 153 | 34.0 | 42 | 19.0 | 2.1 | 10.0 | 98.0 | 327 | 455 | 646 |
| 23 | D1 | 315 | 3700 | 135 | 0.48 | 132 | 29.3 | 42 | 18.0 | 1.8 | 22.4 | 269 | 486 | 633 | 798 |
| 24 | D1 | 135 | 3700 | 315 | 0.48 | 125 | 27.8 | 42 | 17.5 | 2.5 | 26.5 | 95.8 | 249 | 373 | 655 |

TABLE 13-continued

| Experiment No. | Cement or cement Composition Type | Cement or cement Composition Qty (kg/m3) | Blast furnace slag powder Fineness (cm2/g) | Blast furnace slag powder Content (kg/m3) | HRWR agent (%) | Water Content (kg/m3) | Water-binder ratio (%) | Sand-coarse agg. ratio (%) | Slump (cm) | Air Content (%) | Water Reduction (%) | Compressive strength (kgf/cm2) 1 day | 3 day | 7 day | 28 day |
| --- | --- | --- | --- | --- | --- | --- | --- | --- | --- | --- | --- | --- | --- | --- | --- |
| 25 | D1 | 315 | 9700 | 135 | 0.48 | 133 | 29.6 | 42 | 17.5 | 1.4 | 21.8 | 305 | 568 | 735 | 901 |
| 26 | D1 | 135 | 9700 | 315 | 0.48 | 142 | 31.6 | 42 | 18.0 | 1.4 | 16.5 | 140 | 371 | 523 | 713 |

Note
1) Cement (M1) used is a high early strength portland cement manufactured by Mitsubishi Mining and Cement Co., Ltd.
2) Cement composition (C1) is a modified cement composition obtained by treating the cement (M1) with a 32.43% aqueous solution of high-range water-reducing agent.
3) Blast furnace slag used are two types of Esment (proprietary name), manufactured by Nippon Steel Corporation. Specific gravity of the type with a fineness of 3700 cm$^2$/g was 2.94, and that of the type with a fineness of 9700 cm$^2$/g was 2.89.
4) Fine aggregate is Oi River System pit sand, with specific gravity of 2.63 and fineness modulus of 2.71.
5) Coarse aggregate is Ohme greywacke crushed stone, with specific gravity of 2.64 and maximum diameter of 20 mm.
6) High-range water-reducing agent is a commercial by available condensate of sodium $\beta$-naphthalene sulfonate and formaldehyde

CONCLUSIONS

As can be seen from the test results given in Table 13, concretes using the cement compositions containing the modified cement composition (D1) obtained by the method of this invention and ground blast-furnace slag, compared with concretes containing cement not treated according to the invention (M1) and ground blast-furnace slag, show extremely marked reduced water content and extremely marked increased compressive strengths.

Further, the compressive strengths of concretes in which 30 to 70% of the composition (D1) is replaced by ground blast-furnace slag of size 3700 cm$^2$/g, compared with concretes using untreated cement compositions is prepared, and as can be seen from Test No. 32, a cement composition with the cement composition (D1) in which 50% is replaced by ground blast-furnace slag of size (fineness) 9700 cm/g is prepared. In all of the tests, the other concrete components are the same as in Example 5. The amount of high-range water-reducing agent added to the total quantity of cement composition is 0.48% (by dry weight to the cement in the batch), and mixing is done on addition of the agent.

The fly ash used in the various tests was made by EPDC Fly Ash Co., Ltd., while the ground blast-furnace slag was Esment (proprietary name) manufactured by Nippon Steel Corporation.

The test results of the concretes made in the various tests are given in Table 14.

TABLE 14

| Experiment No. | Cement or cement Composition Type | Cement or cement Composition Qty (kg/m3) | Mineral additive Type | Mineral additive Qty (kg/m3) | HRWR agent (%) | Water Content (kg/m3) | Water-binder ratio (%) | Sand-coarse agg. ratio (%) | Slump (cm) | Air Content (%) | Compressive strength (kgf/cm2) 1 day | 3 day | 7 day | 28 day |
| --- | --- | --- | --- | --- | --- | --- | --- | --- | --- | --- | --- | --- | --- | --- |
| 27 | M1 | 450 | — | 0 | 0.48 | 169 | 37.6 | 42 | 19.0 | 2.0 | 258 | 503 | 593 | 691 |
| 28 | M1 | 270 | Fly ash | 135 (40%) | 0.48 | 151 | 33.6 | 42 | 19.0 | 2.0 | 161 | 337 | 421 | 542 |
| 29 | M1 | 225 | Bl. fur. slag | 225 (50%) | 0.48 | 160 | 35.6 | 42 | 19.0 | 2.1 | 141 | 258 | 489 | 662 |
| 30 | C1 | 450 | — | 0 | — | 138 | 30.7 | 42 | 18.0 | 1.6 | 370 | 665 | 749 | 867 |
| 31 | D1 | 270 | Fly ash | 180 (40%) | 0.48 | 124 | 27.6 | 42 | 17.5 | 1.6 | 241 | 494 | 607 | 772 |
| 32 | D1 | 225 | Bl. fur. slag | 225 (50%) | 0.48 | 137 | 30.4 | 42 | 19.0 | 1.3 | 223 | 454 | 604 | 821 |

Note
1) Cement (M1) used is a high early strength portland cement manufactured by Mitsubishi Mining and Cement Co., Ltd.
2) Cement composition (C1) is a modified cement composition obtained by treating the cement (M1) with a 32.43% aqueous solution of high-range water-reducing agent.
3) Cement composition (D1) is a cement composition obtained by treating cement (M1) with 1% water by the method of this invention.
4) Fly ash is manufactured by EPDC Fly Ash Co., Ltd., with specific gravity of 2.19 and fineness of 2880 cm$^2$/g.
5) Blast furnace slag is Esment (proprietary name), manufactured by Nippon Steel Corporation with a fineness of 9700 cm$^2$/g was 2.89.
6) Fine aggregate is Oi River System pit sand, with specific gravity of 2.63 and fineness modulus of 2.71.
7) Coarse aggregate is Ohme greywacke crushed stone, with specific gravity of 2.64 and maximum diameter of 20 mm.
8) High-range water-reducing agent is commercial by available condensate of sodium $\beta$-naphthalene sulfonate and formaldehyde (M1) having the same amount of cement composition replaced increase by 97 and 23 kgf/cm$^2$ after 1 day and 142 and 38 kgf/cm$^2$ after 28 days.

In cases of cement compositions using ground blast-furnace slag of fineness 9700 cm$^2$/g with same amount of replacement as above, the compressive strengths are increased over (M1) concretes by 133 and 67 kgf/cm$^2$ after 1 day, while after 28 days increases of 245 and 96 kgf/cm$^2$ can be seen.

EXAMPLE 9

As can be seen from Test No. 31 in Table 14, a cement composition with the cement composition (D1) prepared in Example 5 in which 40% is replaced by fly ash

EXAMPLES 10-13

A) Manufacture of Fresh Mortar

1. A high-early-strength portland cement (mfd. by Mitsubishi Mining & Cement Co., Ltd.) is supplied at a rate of 18.75 kg/min to a continuous mixer (Spiral Pin Mixer SPM-25D Improved Model (mfd. by Pacific Machinery & Engineering Co., Ltd.), see Japan Patent Kokoku No. 61-16463, Japan Patent Kokoku No. 62-289225, Japan Utility Model Kokoku No. 62-199127), and an aqueous solution of high-range water-reducing agent, (a commercially available condensate of $\beta$-naphthalene sulfonate and formaldehyde- 32.43% concentration) is continuously sprayed at a feeding rate of 277.5 g/min to prepare a modified cement composition (A1) using the treatment of the method of this invention. The moisture content is 1% and the amount of high-range water-reducing agent is 0.48% based on the dry weight added to the high-early-strength portland cement used. Using the cement composition (A1), the periods of time from immediately after preparation until coming into contact with mixing water were made the seven cases shown in Table 1, and fresh mortars are manufactured mixing together with sand in the respective cases.

2. Further a cement composition (A2) is prepared by continuously spraying 1% water on the high-early-strength portland cement. For varying periods of time from immediately after preparation of said cement composition (A2) until the cement composition comes into contact with mixing water to which a high-range water-reducing agent, (a commercially available condensate of β-naphthalene sulfonate and formaldehyde) is added seven, fresh mortars shown in Table 1 are made.

3. A mixture of the same quantity of high-early-strength portland cement as in paragraph 1 above and a powder high-range water-reducing agent, a commercially available condensate of β-naphthalene sulfonate is supplied to the continuous mixer, and by continuously spraying a cement composition (A3) with 1% of water a high-early-strength portland cement is prepared. Six compositions are made using this cement composition (A3), for varying periods of time from immediately after preparation until coming into contact with mixing water as shown in Table 1. Fresh mortars are manufactured mixing together with sand in the respective cases.

B) Tests of Fresh Mortars

Flow values are measured on the fresh mortars obtained as in paragraph 1 above, in accordance with JIS R 5201. Tests are performed for the respective cement compositions, (A1), (A2), and (A3). The results are given in Table 1. The control in Table 1 was high-early-strength portland cement (mfd. by Mitsubishi Mining & Cement Co., Ltd.) not provided the previously-mentioned special treatment.

TABLE 15

| Cement Composition | Time Elapsed 1) | Mortar Mix Proportions 2) | | | |
|---|---|---|---|---|---|
| | | Water-cement Ratio 3) | Sand-cement Ratio 4) | Admixture (%) | Mortar Flow (mm) |
| Control | — | 0.38 | 2.5 | 0.48 | 136 |
| A1 | 30 sec | 0.38 | 2.5 | — | 173 |
| | 1 min | | | | 179 |
| | 3 min | | | | 191 |
| | 5 min | | | | 195 |
| | 10 min | | | | 195 |
| | 1 hr | | | | 200 |
| | 24 hr | | | | 196 |
| A2 | 20 sec | 0.38 | 2.5 | 0.48 | 176 |
| | 1 min | | | | 179 |
| | 3 min | | | | 190 |
| | 5 min | | | | 195 |
| | 10 min | | | | 200 |
| | 1 hr | | | | 202 |
| | 1 hr | | | | 202 |
| | 24 hr | | | | 200 |
| A3 | 1 min | 0.38 | 2.5 | — | 174 |
| | 3 min | | | | 179 |
| | 5 min | | | | 183 |
| | 7 min | | | | 190 |
| | 1 hr | | | | 195 |

TABLE 15-continued

| Cement Composition | Time Elapsed 1) | Mortar Mix Proportions 2) | | | |
|---|---|---|---|---|---|
| | | Water-cement Ratio 3) | Sand-cement Ratio 4) | Admixture (%) | Mortar Flow (mm) |
| | 24 hr | | | | 195 |

Note 1) Time elapsed is the time from immediately after preparation of the cement composition until coming into contact with mixing water.
Note 2) The various ratios to cement are the ratios to cement compositions in powder form provided with special treatment.
Note 3) Water is mixing water.
Note 4) Sand used was Shizuoka Prefecture Oi River System pit sand (specific gravity 2.63, F.M. 2,71).
Note 5 High-range water-reducing agent: formalin condensate of β-naphthalene sulfonate (commercial product).

EXAMPLES 14–16

1) Manufacture of Fresh Concrete

1. Using the Spiral Pin Mixer SPM-25D Improved Model mentioned Examples 10 to 13, a High-early-strength portland cement (mfd. by Mitsubishi Mining & Cement Co., Ltd.) is produced. Further, a cement composition (B1) is prepared by continuously spraying 1% water on the high-early-strength portland cement. Concrete is manufactured by supplying aggregates and mixing water inside the mixer in a manner so that the cement composition (B1) would comes into contact with the mixing water after 5 minutes had elapsed from preparation of the cement composition.

2. Using the same continuous mixer as for paragraph 1 above (EX. 10–13), water is continuously sprayed on a high-early-strength portland cement to prepare a cement composition (B2) consisting of 1% water added to high-early-strength portland cement. After 5 minutes have elapsed from preparation, it is added to mixing water to which a high-range water-reducing agent, a commercial available condensate of β-naphthalene sulfonate and formaldehyde (hereinafter abbreviated to "BNS") has been added, and aggregates are supplied to the mixer, and mixing is performed to manufacture concrete.

3. High-early-strength portland cement is supplied at a rate of 18.75 kg/min to the above-mentioned continuous mixer, an aqueous solution of high-range water-reducing agent (BNS) having a 32.43% concentration is continuously supplied at a feeding rate of 277.5 g/min, and a modified cement composition (B3) is prepared on providing the previously-mentioned special treatment. The amount of moisture is 1% and of high-range water-reducing agent is 0.48% by dry weight that is added to the cement composition (B3) obtained above. To this cement composition (B3), aggregates and mixing water are added after 5 minutes has elapsed from preparation, and mixing performed to manufacture concrete.

COMPARATIVE EXAMPLE A

High-early-strength portland cement is supplied together with aggregates and mixing water into a mixer without providing the previously-mentioned special treatment, and mixing is performed to manufacture concrete.

COMPARATIVE EXAMPLE B

High-early-strength portland cement was supplied together with aggregates and mixing water to which a high-range water-reducing agent (BSN) was added into a mixer with out providing the previously-mentioned special treatment, and mixing was performed to manufacture concrete.

2) Tests of Fresh Concrete

Concrete tests were performed on compositions (B1), (B2) and (B3) with the fresh concretes obtained in the paragraph 1). The test results are given in Table 16.

TABLE 16

| No. | Cement Composition | BNS Dosage 1) (c×%) | W/C | Amount kg(m3) Cement | Amount kg(m3) Water | s/a (%) | Consistency Slump (cm) | Consistency Flow (cm) | Air (%) | Bleeding (cm3/cm3) | Setting Time (hr:min) Initl | Setting Time (hr:min) Final | Compressive strength (kgf/cm2) 1 d | Compressive strength (kgf/cm2) 3 d | Compressive strength (kgf/cm2) 7 d | Compressive strength (kgf/cm2) 28 d | 28-d Static Modulus Elasticity (× 105) |
|---|---|---|---|---|---|---|---|---|---|---|---|---|---|---|---|---|---|
| 1 | Comparative Expl. 1 | — | 0.600 | 320 | 192 | 47 | 18.5 | 29.5 | 1.4 | 0.35 | 4:55 | 7:05 | 94.0 (100) | 206 (100) | 325 (100) | 421 (100) | 3.49 |
| 2 | Comparative Expl. 2 | 0.45 | 0.522 | 320 | 167 | 47 | 18.5 | 29.0 | 2.4 | 0.14 | 4.25 | 6.05 | 119 (127) | 287 (139) | 395 (122) | 504 (120) | 3.72 |
| 3 | B1 | — | 0.578 | 320 | 185 | 47 | 18.0 | 28.5 | 2.1 | 0.29 | 5:00 | 6:50 | 67.0 (71) | 194 (94) | 299 (92) | 414 (98) | 3.68 |
| 4 | B2 | 0.45 | 0.438 | 320 | 140 | 47 | 18.5 | 30.0 | 2.9 | 0.08 | 5:55 | 7:20 | 183 (195) | 417 (202) | 525 (162) | 626 (149) | 3.76 |
| 5 | B3 | — | 0.444 | 320 | 142 | 47 | 18.0 | 29.5 | 2.7 | 0.07 | 5:40 | 7:00 | 190 (202) | 420 (204) | 561 (173) | 641 (152) | 4.07 |

Note 1) Dosage of BNS is percent by weight of cement.
Note 2) Figures in ( ) are compressive strength ratios to Comparative Example 1.
Note 3) Materials used for concrete:
Cement          High-early-strength portland cement mfd. by Mitsubishi Mining & Cement Co., Ltd.
Fine aggregate  Shizuoka Prefecture Oi River System pit sand. Specific gravity 2.63, FM 2.71
Coarse aggregate Tokyo-to Ohme graywacke crushed stone. Specific gravity 2.65, FM 6.78

The fluidity of mortar or concrete manufactured by the method of this invention is superior to the fluidity of mortar or concrete manufactured by an ordinary method. Further, whereas the flow of mortar using the high-range water-reducing agent (BSN) for high-early-strength portland cement not treated according to the invention has a value of 136 mm at identical water-cement ratio as shown in Table 15, the flow of mortar manufactured using the cement composition (A1), (A2) or (A3) with sand and mixing water supplied into the mixer and mixing after 3 minutes had elapsed from preparation is greater in the range of 190 to 202 mm, and so it can be seen that fluidity had been marked by improved. Also, as can be seen from Table 15 and Table 16, that not only is fluidity improved, but the amount of water required for identical slump is reduced. And settling of the mortar or concrete after placement decreases. Bleeding is reduced by improvement in water-reducing properties, occurence of settling cracks is inhibited and strength gain properties are improved, together with which a mortar or concrete of good durability is obtained.

The method of manufacturing mortar or concrete of this invention, in comparison with the case of manufacturing by the normal method, makes it possible to greatly improve the performance of the mortar or concrete, and the various properties are significantly improved.

1) In case of the method of this invention, when the quantity of mixing water for preparing the cement composition in the cement mortar, cement grout, or concrete is used in the same quantity as the abovementioned cement mixture manufactured by the normal method, the fluidity of these are greatly increased.

Consequently, workability, the cement mixture's fillability, self-levelling properties, etc. are improved and further, the quantity of the cement mixture obtained will be excellent and transportation of the abovementioned cement mixture over a long period of time is made possible.

2) In case of the method of this invention, when the consistency of the cement mixture such as cement mortar, cement grout, or concrete is made identical to that of a cement mixture manufactured by the ordinary method, the quantity of water required for mixing is extremely small.

Consequently, the fresh mortar or fresh concrete manufactured by the method of this invention will possess the excellent characteristics as indicated below in the mortar or concrete after having hardened.

1. Strength and durability are extremely high as the amount of water used becomes extremely small.
2. Occurence of drying shrinkage cracks is decreased as drying shrinkage is reduced.
3. As the quantity of bleeding is reduced, settling of mortar or concrete when placing is reduced along with which there are less settling cracks.
4. As the unit water content used becomes extremely low, the density of mortar or concrete is high, and durability is excellent.
5. When obtaining mortar or concrete of the same strength it becomes possible to reduce the unit cement content, making it possible to reduce the quantity of initial heat of hydration and the occurence of cracking due to thermal stresses can be reduced.

We claim:

1. A method for manufacturing a cementitious composition comprising
   a) uniformly fluidising, in a container, particles of a substantially dry powdered cement by creating aerial motion of the particles by rotational motion perpendicular to the fall of the particles,
   b) at the same time uniformly spraying the particles with 0.1 to 10 parts by weight (per 100 parts of cement) of water, optionally containing a cement admixture, and c) mixing the particles and the water intensively by shearing forces.

2. A method according to claim 1 comprising
d) mixing the cement substantially dry with aggregate or cement additive for at least 3 minutes prior to treating with mixing water, after method step c).

3. A method according to claim 1 in which prior to the addition of water, a cement additive and/or a cement admixture is added to the cement.

4. A method according to claim 3 in which the cement additive is selected from fly ash, ground blast furnace slag and finely divided silica powder.

5. A method according to claim 1 in which during water addition the water contains a cement admixture.

6. A method according to claim 1 in which the cement of the cementitious composition is selected from portland cement, high alumina cement and blended cement.

7. A method according to claim 1 in which the cementitious composition is an ultra-rapid hardening cement.

8. A method according to claim 1 in which the cement admixture is a superplasticizer, a plasticizer or a water reducing agent.

9. A method according to claim 8 in which the admixture is selected from an air entraining water reducing agent or a high range water reducing agent.

10. A method according to claim 8 or 9 in which the admixtures include products based on gluconate, glucoheptonate, ligninsulphonate, dextrin, alkali carbonate, citrate, condensation products of naphthalene sulphonate or melamine sulphonate with formaldehyde, polymers based on an aromatic amino sulphonate, polystyrene sulphonate, hydroxypolyacrylate, a copolymer of an $\alpha$ or $\beta$ unsaturated dicarboxylic acid and an olefin, a copolymer of polyethylene glycol monoaryl ethers with maleic acid or a copolymer derived from monomers capable of copolymerization with such monomers; a copolymer of isobutylene-styrene with maleic acid, a copolymer of isobutylene-acrylic acid ester and maleic acid; a copolymer of isobutylene-styrene-acrylic acid ester with maleic acid; and a copolymer derived from a polyalkylene glycol monomethacrylic acid ester or polyalkylene glycol monoacrylic acid ester and acrylic acid or methacrylic acid; set retarding agents, set accelerating agents, strength increasing agents, air content adjustment agents, anti-freeze agents or pigments.

11. A method according to claim 1 which is a continuous process.

12. A method according to claim 1 in which fluidisation is obtained by the rotation of a continuous type mixer.

13. A method according to claim 1 in which application of the water to the cementitious composition is by spraying so as to give a uniform distribution of moisture.

14. A method according to claim 1 in which shearing forces occur in the container by a revolving rotor carrying protruding pins.

* * * * *